July 13, 1954 C. M. WEEKS 2,683,434
AUTOMATIC PILOT
Filed May 24, 1951 2 Sheets-Sheet 1
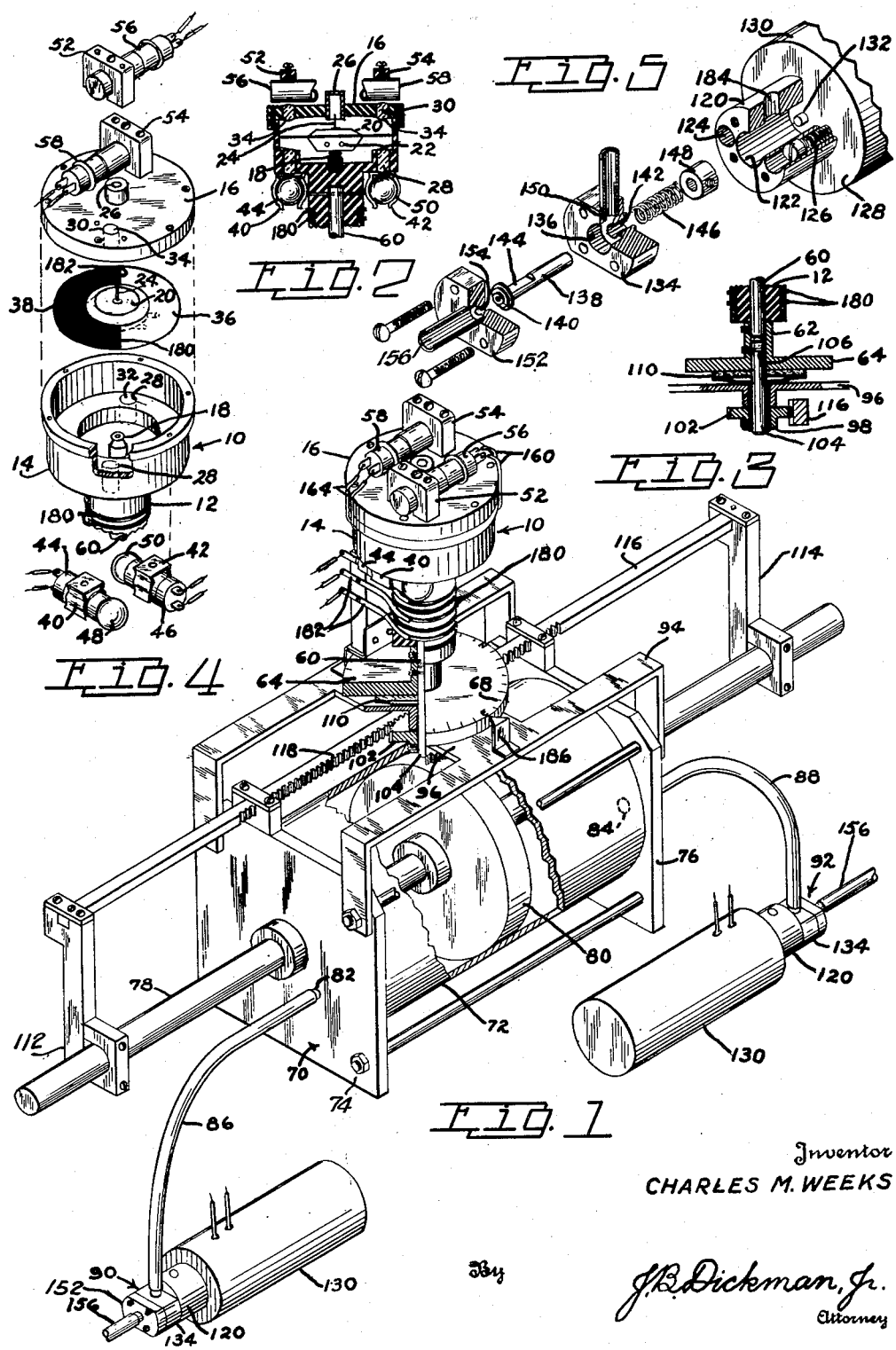
Inventor
CHARLES M. WEEKS
By J. B. Dickman, Jr.
Attorney July 13, 1954

C. M. WEEKS 2,683,434

AUTOMATIC PILOT

Filed May 24, 1951

INVENTOR.
CHARLES M. WEEKS

BY

J.B.Dickman, Jr.
ATTORNEY

Patented July 13, 1954

2,683,434

UNITED STATES PATENT OFFICE 2,683,434

AUTOMATIC PILOT

Charles M. Weeks, Takoma Park, Md.

Application May 24, 1951, Serial No. 228,108

3 Claims. (Cl. 114—144)

The present invention relates to an automatic pilot and has for its primary object to hold a moving object on a predetermined course relative to the earth's magnetic field.

Another object of the present invention is to maintain a magnetic compass in a substantially static relation to the earth's magnetic field irrespective of the pitching or rolling of the object upon which it is mounted.

A still further object of the present invention is to establish direct control of the steering mechanism of a moving object by a magnetic compass and to avoid the necessity for periodic correction such as is required by automatic pilot mechanism heretofore employed.

The above and other objects of the present invention may be attained by employing this invention which embodies among its features a pair of spaced light sensitive cells illuminating means for projecting light beams toward the cells, a magnetically controlled screen mounted to move in an arcuate path between the cells and this respective illuminating means, and means connected to the cells for moving the steering mechanism of a moving object when a cell becomes energized by the impingement of light thereon.

Other features of the present invention include mounting the cells and their respective illuminating means for movement relative to the moving object so that they may be adjusted relative to the screen for predetermining the course to be held by the moving object.

Still other features of the present invention include means connected to the steering mechanism of a moving object and the cells and illuminating means for moving said cells and their respective illuminating means in an arcuate path about the axis of a magnetically controlled screen in order to interpose the screen between the cells and their respective illuminating means as the moving object responds to the movement of the steering mechanism.

In the drawings,

Figure 1 is a perspective view of an automatic pilot embodying the features of this invention.

Figure 2 is a fragmentary sectional view through the upper end of the binnacle.

Figure 3 is a view similar to Figure 2 of the lower end of the binnacle.

Figure 4 is an exploded view of the binnacle.

Figure 5 is an exploded view of one of the electrically actuated valves, and

Figure 6:
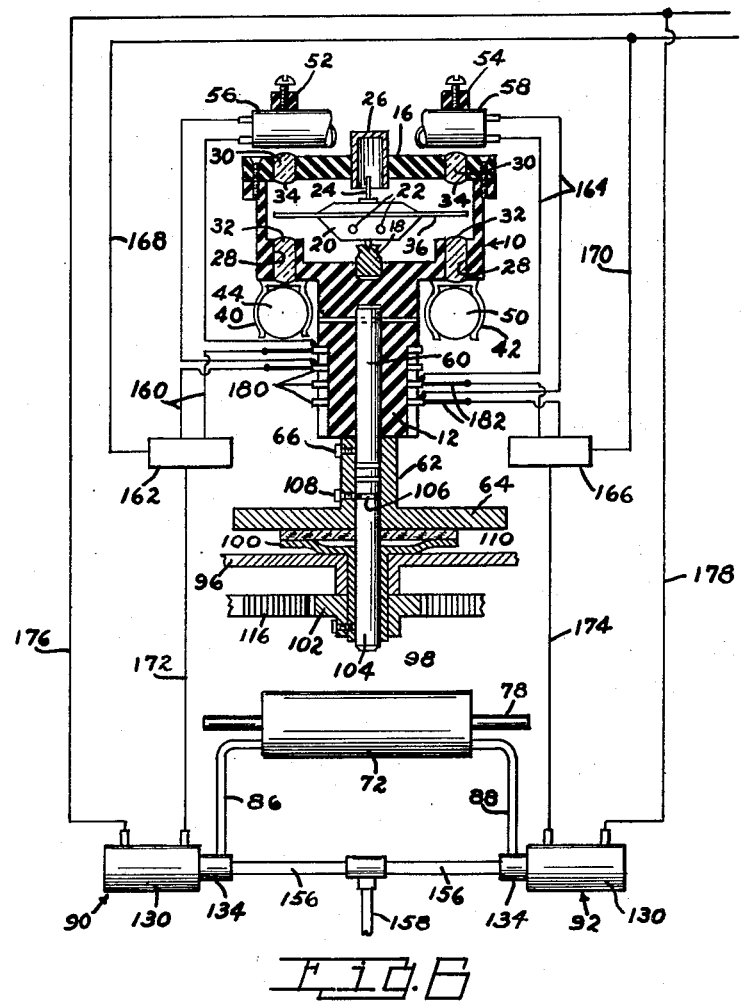
Figure 6 is a view illustrating diagrammatically the connections between the light sensitive calls and the electrically actuated valves.

Referring to the drawings in detail a binnacle designated generally 10 comprises a stem or standard 12 of non-conducting material such as hard rubber is provided at its upper end with an enlarged hollow cylindrical head 14 forming a case in which are housed the magnetic elements which are responsive to the earth's magnetic field. A cover 16 closes the upper open end of the case 14 and mounted in the bottom of the case 14 in axial alignment with the stem 12 is a bearing 18 in which is mounted the lower bearing of a rotor 20 in which are mounted permanent magnets 22 which tend to stabilize the rotor 20 with relation to the earth's magnetic field. A spindle 24 projects axially upwardly from the rotor 20 and is received at its upper end in an inverted cup 26 mounted in the cover 16 in axial alignment with the bearing 18. Formed in the bottom wall of the head 14 in substantially diametrically spaced relation are windows 28 the axes of which lie parallel to the axis of the rotor 20 and similar windows 30 are formed in the cover 16. The windows 30 of the cover 16 align with the windows 28 of the head 14 and in the preferred form of the invention these windows 28 and 30 are closed by bodies 32 and 34 respectively of transparent material having convex ends to provide light condensing lenses. Carried by the rotor 20 for rotation therewith in an arcuate path which lies between adjacent ends of the windows 28 and 30 is a disk 36 of transparent material having an opaque area forming a screen 38 which when interposed between the windows 28 and 30 will interrupt the passage of light therethrough.

Mounted in suitable clips 40 and 42 on the under side of the head 14 adjacent the windows 28 are lamp sockets 44 and 46 in which lamps 48 and 50 are mounted so as to direct rays through the windows 28. The rays falling upon the transparent bodies 32 are condensed thereby into beams which are directed toward the transparent bodies 34 by which they are further condensed into light bundles when the screen 38 fails to obstruct the passage of light between the windows 28 and 30. Mounted in the cover 16 adjacent the windows 30 therein are brackets 52 and 54 in which are supported light sensitive photoelectric cells 56 and 58 respectively which are so disposed with relation to the windows 30 that light passing therethrough will impinge on said cells and cause the latter to become excited.

Extending into the stem or standard 12 axially through the end thereof remote from the head 14 is a shaft 60 the lower end of which extends beyond the lower end of the stem or standard 12 and into the upper end of a socket 62 carried by a friction disk 64. A set screw 66 extends radially through the socket 62 near the upper end thereof and impinges on the shaft 60 in order to secure the shaft 60 to the socket 62 for rotation therewith. The top surface of the friction disk 64 is provided adjacent its periphery with an annular row of indices 68 representing the various points of the compass and the degrees therebetween.

A steering apparatus control device designated generally 70 is disposed below the binnacle 10 and comprises a cylinder 72 closed at opposite ends by plates 74 and 76 each having an axial opening therein through which works an elongated piston rod 78. A piston 80 is contained within the cylinder 72 and is connected to the piston rod 78 for movement therewith. Ports 82 and 84 open through opposite plates 74 and 76 into the cylinder 72 and are connected by suitable ducts 86 and 88 to electrically actuated valves 90 and 92 respectively.

Supported on suitable arms 94 carried by the end plates 74 and 76 is a cross member 96 and mounted in said cross member for rotation about a vertical axis is a sleeve 98 carrying at its upper end a laterally extending dished annular flange 100. A pinion 102 is fixed to the sleeve 98 adjacent the lower end thereof for rotation therewith and extending axially through said sleeve 98 and fixed thereto for rotation therewith is a stub shaft 104 the upper end of which projects above the flange 100 and is recessed in the lower end of the socket 62 in axial alignment with the shaft 60. An annular groove 106 is formed in the stub shaft 104 adjacent the upper end thereof and a screw 108 extends radially through the socket 62 into the groove 106 to effect a coupling between the shafts 60 and 104 that will permit a relative rotation therebetween. A friction disk 110 is disposed on the dished flange 100 for co-operation with the friction disk 64 to effect driving connection between the shafts 60 and 104.

Carried on suitable brackets 112 and 114 carried by the piston rod 78 adjacent opposite ends thereof is a rack bar 116 carrying along one side a row of teeth 118 which mesh with the teeth of the pinion 102 so that when the rack bar 116 moves, the shaft 104, 60 and the stem or standard 12 will move in unison therewith.

Each valve 90 and 92 comprises a housing 120 having an axial bore 122 and a pair of diametrically spaced bores 124 which lie parallel to the axial bore 122. Attaching screws 126 extending into the bores 124 secure the housing 120 to an end plate 128 of a solenoid 130 in axial alignment with the plunger 132 thereof and closing the end of the bore 122 is a valve body 134 having a valve chamber 136 formed therein. A valve stem 138 extends axially through the valve body 134 and carries adjacent one end thereof a valve head 140 which works within the chamber 136. The valve stem 138 projects through an axial opening 142 in the valve body 134 and is provided adjacent the head 140 with a flattened portion 144. A compression coiled spring 146 surrounds the valve stem 138 between the valve body 134 and the housing 120 and secured to the valve stem 138 adjacent the end thereof remote from the head 140 is a collar 148 which forms a stop against which bears the end of the spring 146 remote from the valve body 134. The valve body 134 is provided with a radial port 150 which communicates with the chamber 136 and closing the end of the valve body 134 remote from the solenoid 128 is a cover plate 152 having an axial port 154 extending therethrough and communicating with the valve chamber 136. A source of vacuum or reduced pressure (not shown) is coupled through a duct 156 and tube 158 to the ports 154 of the valve 134 so that when the valves 134 are open the pressure within the cylinder 72 on each side of the piston 80 will be equal and the piston 80 will remain stationary within the cylinder 72. Obviously when a valve 140 moves off its seat at the junction of the bores 136 and 142 in the valve body 134 the flat portion 144 of the valve stem 138 will cooperate with the wall of the bore 142 in establishing communication between the bore 136 and the surrounding atmosphere, thus admitting air to the cylinder 72 and causing the piston 80 to move therein.

Conductors 160 lead from the cell 154 to a suitable amplifier and relay 162 which amplifies the current generated by the cell 54 and closes a power circuit through the coil 130 of the solenoid 90 to cause the solenoid plunger 132 to advance and engage the end of the adjacent valve stem 138. This will cause the valve 140 carried by the stem 138 to move off of its seat and admit air to the cylinder 72 behind the left side of the piston 80 as viewed in Figure 1. Conductors 164 lead from the cell 56 to an amplifier and relay 166 similar to the relay and amplifier 162 so that when the cell 56 becomes excited the valve 134 of the solenoid 92 will be opened to admit air to the cylinder 72 on the right side of the piston 80 when viewed as in Figure 1. The relays of the amplifiers and relays 162 and 166 are connected through suitable conductors 168 and 170 to a suitable source of electrical energy (not shown) and through suitable conductors 172 and 174 to one terminal of each solenoid 90 and 92 respectively. The other terminals of the solenoids 90 and 92 are connected respectively by conductors 176 and 178 to the power source.

The screening area 38 of the disk 36 is of such proportions that in the normal operation of the device, opposite edges 180 and 182 thereof will just lie in the paths of light passing between the windows 28 and 34 so that the slightest deviation of the angular relation between the edges 180 and 182 of the screen 38 and the beams of light passing through the windows 28 and 34 will expose one or the other cell 46 or 58 to the light rays and cause excitement thereof. Such excitement of the cell will actuate the solenoid on its respective side of the device and cause it to open its respective valve 134 and admit air to the cylinder 72. This will cause the piston 80 and piston rod 78 to move within the cylinder 72 and with the rod 78 coupled to the steering mechanism of the moving object, the course of the object will be altered. With the movement of the rod 78, the rack bar 116 will rotate the pinion 102 to cause the binnacle 10 to revolve about its vertical axis and again bring the light beams passing between the windows 28 and 30 into the screened area 38. By thus interrupting the passage of light between the windows 28 and 30, both cells 56 and 58 are de-energized so that the valves 140 of the respective solenoids 90 and 92 are restored to the closed position under the influence of their respective springs 146. Hence the air previously admitted to the cylinder 72 is exhausted and the movement of the piston 80 is arrested. Thus the steering mechanism of the moving object is held against movement until a cell 56 or 58 is again excited by exposure to light emanating from its respective lamp 48 or 50.

In the preferred form of the invention the stem or standard 12 is provided with slip rings 180 and brushes 182 forming parts of the conductors 160 and 164 and each housing 120 is provided with a port 184 to admit air to the bore 122 therein.

In setting the device to maintain a moving object on a predetermined course relative to the earth's magnetic field the binnacle 10 is rotated about the stub shaft 104 against the effort of the friction disks 64 and 110 until the light beams passing between the windows 28 and 30 are interrupted by the screened area 38 of the disk 36, it being understood of course that the disk 36 is held against substantial rotation by the magnets 22. The deviation from the north can be determined by the cooperation of the degree markings 68 on the disk 64 with a pointer 186 carried by the cross member 96 in which the stub shaft 104 is mounted and with the device thus set, the slightest deviation of the object from the desired course will be immediately corrected by the automatic pilot acting upon the steering mechanism of the craft.

What is claimed is:

1. In an automatic pilot means movable in a rectilinear path and adapted to be connected with the rudder of a ship for governing the position of said rudder, magnetically controlled means connected to the said rudder governing means for moving the rudder governing means in its rectilinear path to maintain the ship on a predetermined course, means between and connected to the rudder governing means and to the magnetically controlled means for manually selecting the position of the magnetically controlled means relative to the rudder governing means, the means between and connected to the rudder governing means and to the magnetically controlled means comprising, friction disks connected respectively to the rudder governing means and the magnetically controlled means.

2. In an automatic pilot means movable in a rectilinear path and adapted to be connected to the rudder of a ship for governing the position of said rudder, magnetically controlled means mounted above said rudder governing means for rotation about an axis which lies perpendicular to the rectilinear path, means connected to the magnetically controlled means and to the rudder governing means for moving said magnetically controlled means as said rudder governing means moves, means connected to the magnetically controlled means and to the rudder governing means for moving said rudder governing means when the ship deviates from a predetermined course, the means for moving the magnetically controlled means as the rudder governing means moves comprising a rack bar carried by the means movable in a rectilinear path, a pinion meshing with said rack bar and being rotatable about the perpendicular axis, and a friction clutch connected to the pinion and to the magnetically controlled means for establishing manually selected driving connection therebetween.

3. In an automatic pilot, a rudder control rod mounted to move in a substantially horizontal rectilinear path, a housing mounted above said rod for rotation about a substantially vertical axis which intersects the rectilinear path, a rack bar connected to the rod for movement therewith in a rectilinear path, a pinion carried by the housing and meshing with the rack bar for rotating the housing as the rod moves in its rectilinear path, magnetically controlled means carried by the housing and connected to the rod for moving said rod in response to the altering of the position of the magnetically controlled means about the vertical axis, said pinion connected to the housing through the medium of a friction clutch, whereby the position of the housing can be manually altered relative to the pinion.

References Cited in the file of this patent

UNITED STATES PATENTS

| Number | Name | Date |
|---|---|---|
| 1,119,324 | Sprater | Dec. 1, 1914 |
| 1,818,103 | Sperry | Aug. 11, 1931 |
| 1,873,579 | Haas | Aug. 23, 1932 |
| 2,102,513 | Chance | Dec. 14, 1937 |
| 2,112,504 | Mirfield | Mar. 29, 1938 |
| 2,114,479 | Shannon | Apr. 19, 1938 |
| 2,517,612 | Varian | Aug. 8, 1950 |

FOREIGN PATENTS

| Number | Country | Date |
|---|---|---|
| 530,437 | Great Britain | Dec. 12, 1940 |
| 793,301 | France | Nov. 16, 1935 |